(12) United States Patent
Jha et al.

(10) Patent No.: US 11,743,961 B2
(45) Date of Patent: Aug. 29, 2023

(54) METHOD AND SYSTEM FOR PROVIDING SIMULTANEOUS VOICE AND DATA SERVICES IN EN-DC CAPABLE USER EQUIPMENT

(71) Applicant: Samsung Electronics Co., Ltd., Suwon-si (KR)

(72) Inventors: Kailash Kumar Jha, Bangalore (IN); Alok Kumar Jangid, Bangalore (IN); Govind Uttur, Bangalore (IN); Mudit Goel, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 17/250,391

(22) PCT Filed: Jul. 17, 2019

(86) PCT No.: PCT/KR2019/008834
§ 371 (c)(1),
(2) Date: Jan. 15, 2021

(87) PCT Pub. No.: WO2020/017886
PCT Pub. Date: Jan. 23, 2020

(65) Prior Publication Data
US 2021/0298106 A1 Sep. 23, 2021

(30) Foreign Application Priority Data

Jul. 17, 2018 (IN) .............................. 201841026734
Jul. 10, 2019 (IN) .............................. 201841026734

(51) Int. Cl.
*H04W 76/16* (2018.01)
*H04W 8/24* (2009.01)

(52) U.S. Cl.
CPC ............. *H04W 76/16* (2018.02); *H04W 8/24* (2013.01)

(58) Field of Classification Search
CPC ....... H04W 76/16; H04W 8/24; H04W 88/06; H04W 60/04
See application file for complete search history.

(56) References Cited

U.S. PATENT DOCUMENTS

| 8,811,421 B2 | 8/2014 | Su et al. |
| 8,971,128 B2 | 3/2015 | Chin et al. |

(Continued)

FOREIGN PATENT DOCUMENTS

| KR | 10-2016-0062579 A | 6/2016 |
| WO | 2014052501 A1 | 4/2014 |
| WO | 2020040546 A1 | 2/2020 |

OTHER PUBLICATIONS

Supplementary European Search Report dated May 26, 2021, from the European Patent Office in connection with a counterpart European Patent Application No. 19837818.4, 8 pages.

(Continued)

*Primary Examiner* — CongVan Tran

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure especially relates to method and system for providing simultaneous voice and data services in EN-DC capable UE.

(Continued)

The method includes the steps of determining whether a VOLTE service is available at the UE and automatically switching the UE from an EN-DC mode to a Single Radio Long Term Evolution (SRLTE)-ENDC mode in response to determining that the VOLTE is unavailable while the UE is operating in the EN-DC mode.

14 Claims, 9 Drawing Sheets

(56) References Cited

U.S. PATENT DOCUMENTS

| | | | |
|---|---|---|---|
| 9,319,977 B2 | 4/2016 | Nayak et al. | |
| 9,426,839 B2 | 8/2016 | Su et al. | |
| 9,497,652 B2 | 11/2016 | Mujtaba et al. | |
| 9,794,403 B2 | 10/2017 | Shi et al. | |
| 10,136,370 B1* | 11/2018 | Oroskar | H04W 36/0061 |
| 10,237,841 B1* | 3/2019 | Krishnamurthy | H04W 76/38 |
| 10,314,051 B1* | 6/2019 | Oroskar | H04L 1/0071 |
| 2014/0086209 A1 | 3/2014 | Su et al. | |
| 2016/0029222 A1 | 1/2016 | Su et al. | |
| 2016/0095151 A1 | 3/2016 | Chuttani et al. | |
| 2016/0150181 A1 | 5/2016 | Jeong et al. | |
| 2016/0337515 A1 | 11/2016 | Shi et al. | |
| 2016/0344572 A1* | 11/2016 | Brust | H04L 12/66 |
| 2017/0142617 A1* | 5/2017 | Batchu | H04W 36/00835 |
| 2017/0201911 A1* | 7/2017 | Ng | H04W 36/0022 |
| 2018/0083688 A1 | 3/2018 | Agiwal et al. | |
| 2018/0097585 A1 | 4/2018 | Dev et al. | |
| 2019/0268950 A1* | 8/2019 | Youtz | H04W 76/30 |
| 2019/0268962 A1* | 8/2019 | Wang | H04B 17/00 |
| 2020/0008196 A1* | 1/2020 | Low | H04W 72/1215 |
| 2020/0100309 A1 | 3/2020 | Jha et al. | |

OTHER PUBLICATIONS

Examination report under sections 12 & 13 of the Patents Act, 1970 and the Patents Rules, 2003, dated Jul. 1, 2021, from the Indian Patent Office in connection with a counterpart Indian Patent Application No. 201841026734, 6 pages.

China Telecom, "Issues on VoLTE support in NE-DC", 3GPP TSG-RAN WG2 Meeting #99, R2-1709626, Berlin, Germany, Aug. 21-25, 2017, 2 pages.

NOKIA., et al, "Mode selection for inter-system change between EPS and 5GS", 3GPP TSG-CT WG1 Meeting #108, C1-180745, Gothenburg (Sweden), Jan. 22-26, 2018, 17 pages.

International Search Report and Written Opinion of the International Searching Authority in connection with International Application No. PCT/KR2019/008834 dated Oct. 22, 2019, 8 pages.

Intel Corporation, "Introduction of EN-DC capabilities," R2-1804110, 3GPP TSG-RAN2 Meeting #101, Athens, Greece, Feb. 26-Mar. 2, 2018, 6 pages.

European Patent Office, "Communication pursuant to Article 94(3) EPC," dated Feb. 1, 2023, in connection with European Patent Application No. 19837818.4, 7 pages.

* cited by examiner

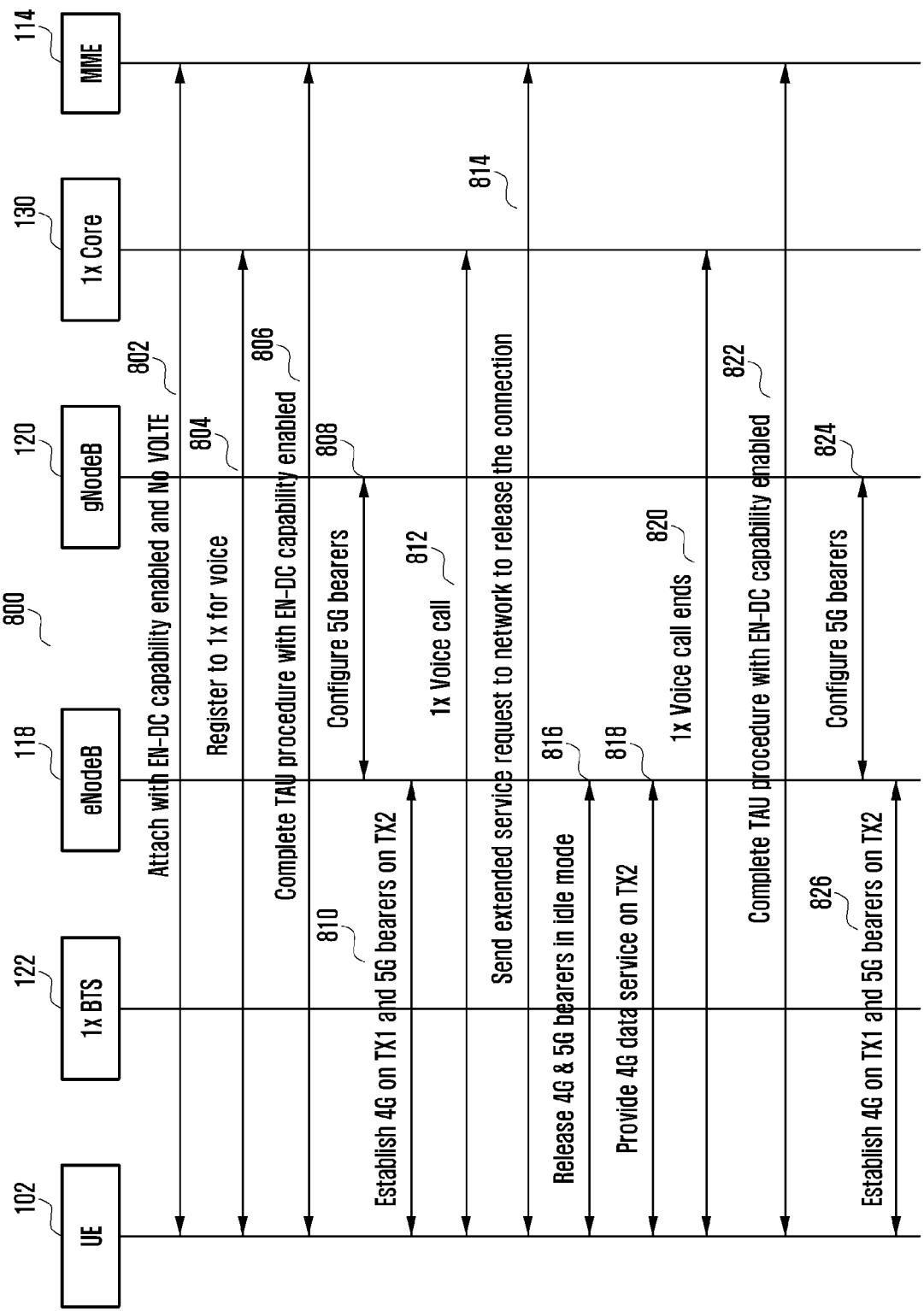

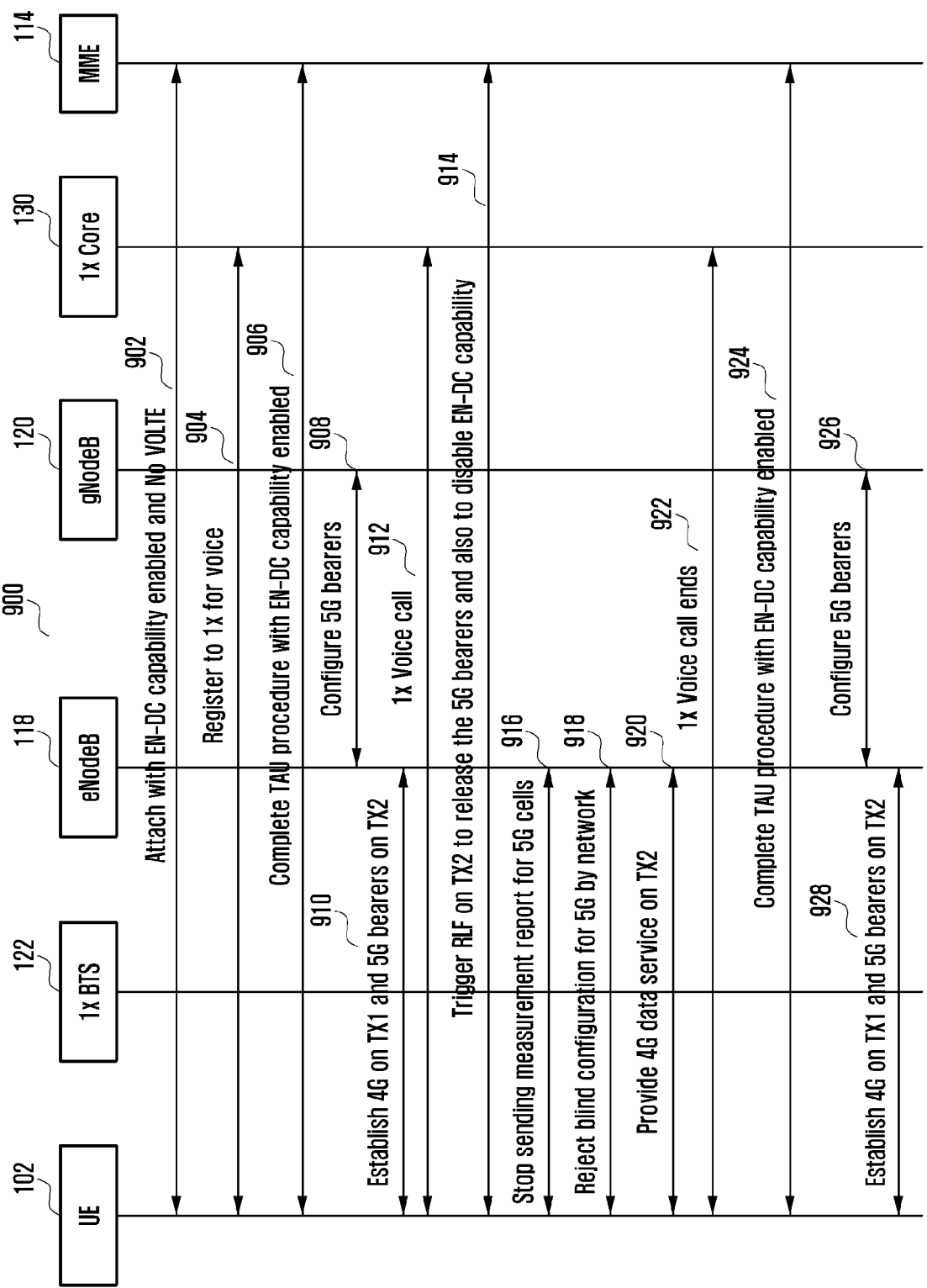

METHOD AND SYSTEM FOR PROVIDING SIMULTANEOUS VOICE AND DATA SERVICES IN EN-DC CAPABLE USER EQUIPMENT

CROSS-REFERENCE TO RELATED APPLICATIONS

This application is a 371 National Stage of International Application No. PCT/KR2019/008834, filed Jul. 17, 2019, which claims priority to Indian Provisional Patent Application No. 201841026734, filed on Jul. 17, 2018, and Indian Patent Application No. 201841026734, filed Jul. 10, 2019, the disclosures of which are herein incorporated by reference in their entirety.

BACKGROUND

1. Field

Embodiments generally relates to a method and system for simultaneous voice and data transfer in an Evolved-Universal Terrestrial Radio Access Network New Radio-Dual Connectivity (EN-DC) capable User Equipment (UE) operating in Single Radio Long Term Evolution (SRLTE) mode without Voice Over Long Term Evolution (VOLTE) support.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In line with this, methods for providing simultaneous voice and data services in EN-DC capable user equipment have been recently researched.

SUMMARY

The principal object of the embodiments herein is to provide a method for simultaneous voice and data services in an EN-DC capable User Equipment (UE) by defining a Single Radio Long Term Evolution (SRLTE)-ENDC mode of operation of the UE.

Another object of the embodiments herein is to provide a method for providing simultaneous voice and 4G data services in an EN-DC capable UE operating in SRLTE-ENDC mode by utilizing the two transceivers available in an the EN-DC capable UE.

Another object of the embodiments herein is to provide a method for providing simultaneous voice and 4G data services in an EN-DC capable UE by handling the two transceivers in an EN-DC capable UE operating in SRLTE-ENDC mode upon receiving a voice call.

Another object of the embodiments herein is to provide a method for automatically switching an EN-DC capable UE from the EN-DC mode to an SRLTE-ENDC mode in response to determining that VOLTE is unavailable while the UE is operating in the EN-DC mode.

Another object of the embodiments herein is to provide a method for providing simultaneous voice and 4G data services in an EN-DC capable UE by configuring the EN-DC capable UE to automatically switch from the EN-DC mode to an SRLTE-ENDC mode in response to determining that VOLTE is unavailable while the UE is operating in the EN-DC mode.

Accordingly, the embodiments herein disclose a method for providing simultaneous voice and data services in an Evolved-Universal Terrestrial Radio Access Network New Radio-Dual Connectivity (EN-DC) capable User Equipment (UE) comprising at least two transceivers. The UE operating in the EN-DC mode determines whether a Voice over Long Term Evolution (VOLTE) service is available. If the VOLTE service is not supported by the network, the UE automatically switches from the EN-DC mode to a Single Radio Long Term Evolution (SRLTE)-ENDC mode in response to determining that the VOLTE is unavailable while the UE is operating in the EN-DC mode. Further, in the SRLTE-ENDC mode of operation, the UE configures a first transceiver of the at least two transceivers for both the voice and data services and a second transceiver of the at least two transceivers for a data service.

In an embodiment, the method includes determining by the UE that VOLTE is unavailable and UE automatically switches from the EN-DC mode to the SRLTE-ENDC mode, by the UE operating in the SRLTE-EN-DC mode, whether a voice call is being initiated when the data service is active on both the first transceiver and the second transceiver of the UE. Upon detecting that the voice call is being initiated when the data service is active on both the first transceiver and the second transceiver, the UE indicates the network entity that that EN-DC capability of the UE is disabled. In an embodiment, the SRLTE-ENDC mode is a mode where when a 1× call is active, data does works on a 4G network and when the 1× Call is idle, data does works on both the 4G network and a 5G network in a split bearer configuration.

In an embodiment, the method comprises automatically switching by the UE from the EN-DC mode to the SRLTE-ENDC mode in response to determining the unavailability of VOLTE while the UE is operating in the EN-DC mode. Further, the method comprises configuring by the UE, the first transceiver for the voice call and the second transceiver based on a first radio for the data service in response to determining that both the voice call and the data service are active. Further, the method comprises configuring by the UE, the data service based on the first radio on the first transceiver and a data service based on a second radio on the second transceiver in response to determining that the voice call is inactive and the data service is active.

Accordingly, the embodiments herein provide a method for configuring the EN-DC capable UE for providing simultaneous voice and data services while operating in an SRLTE-ENDC mode. The EN-DC capable UE includes at least two transceivers, a memory and a processor connected to the memory and the at least two transceivers. The processor is configured to determine whether a VOLTE service is available while the UE is operating in an EN-DC mode. The processor is configured to automatically switch the UE from the EN-DC mode to an SRLTE-ENDC mode in response to determining that the VOLTE is unavailable while the UE is operating in the EN-DC mode. The processor further configures the first transceiver of the at least two transceivers for both the voice and data services and a second transceiver of the at least two transceivers for a data service. Further, the processor automatically switches from the SRLTE-ENDC mode to the EN-DC mode in response to determining that the VOLTE service is available while the UE is operating in the SRLTE-ENDC mode.

Accordingly, the embodiments herein provide a method for providing voice and data services simultaneously in an EN-DC network having a network entity connected to an EN-DC capable UE. The network entity receives an indication that the EN-DC capability of the UE is disabled and disables the EN-DC capability of the UE at the network entity and releases at least one bearer corresponding to at least one radio.

Accordingly, the embodiments herein provide a method of utilizing a system for providing simultaneous voice and data services through an EN-DC capable UE operating in an SRLTE-ENDC mode. The system includes at least two transceivers, a memory and a processor connected to the memory and the at least two transceivers. The processor is configured to determine whether a VOLTE service is available while the UE is operating in an EN-DC mode. The processor is configured to automatically switch the UE from the EN-DC mode to an SRLTE-ENDC mode in response to determining that the VOLTE is unavailable while the UE is operating in the EN-DC mode. The processor further configures the first transceiver of the at least two transceivers for both the voice and data services and a second transceiver of the at least two transceivers for a data service. The system also includes a network entity connected to the UE. The network entity of the system is further configured to receive an indication from the UE that the EN-DC capability of the UE is disabled and further disables the EN-DC capability of the UE at the network entity by releasing at least one bearer corresponding to at least one radio.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments and the embodiments herein include all such modifications.

The present disclosure provides method and system for providing simultaneous voice and data services in EN-DC capable user equipment.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which:

FIG. 8 is a connection sequence diagram illustrating a sequence of steps for providing simultaneous voice and data services using an EN-DC capable UE during a 1× idle mode and a 1× connected mode of operation, according to an embodiment as disclosed herein; and FIG. 9 is a connection sequence diagram illustrating a sequence of steps for providing simultaneous voice and data services using an EN-DC capable UE during a 1× idle mode and a 1× connected mode of operation, according to an embodiment as disclosed herein.

DETAILED DESCRIPTION

Figure 1:
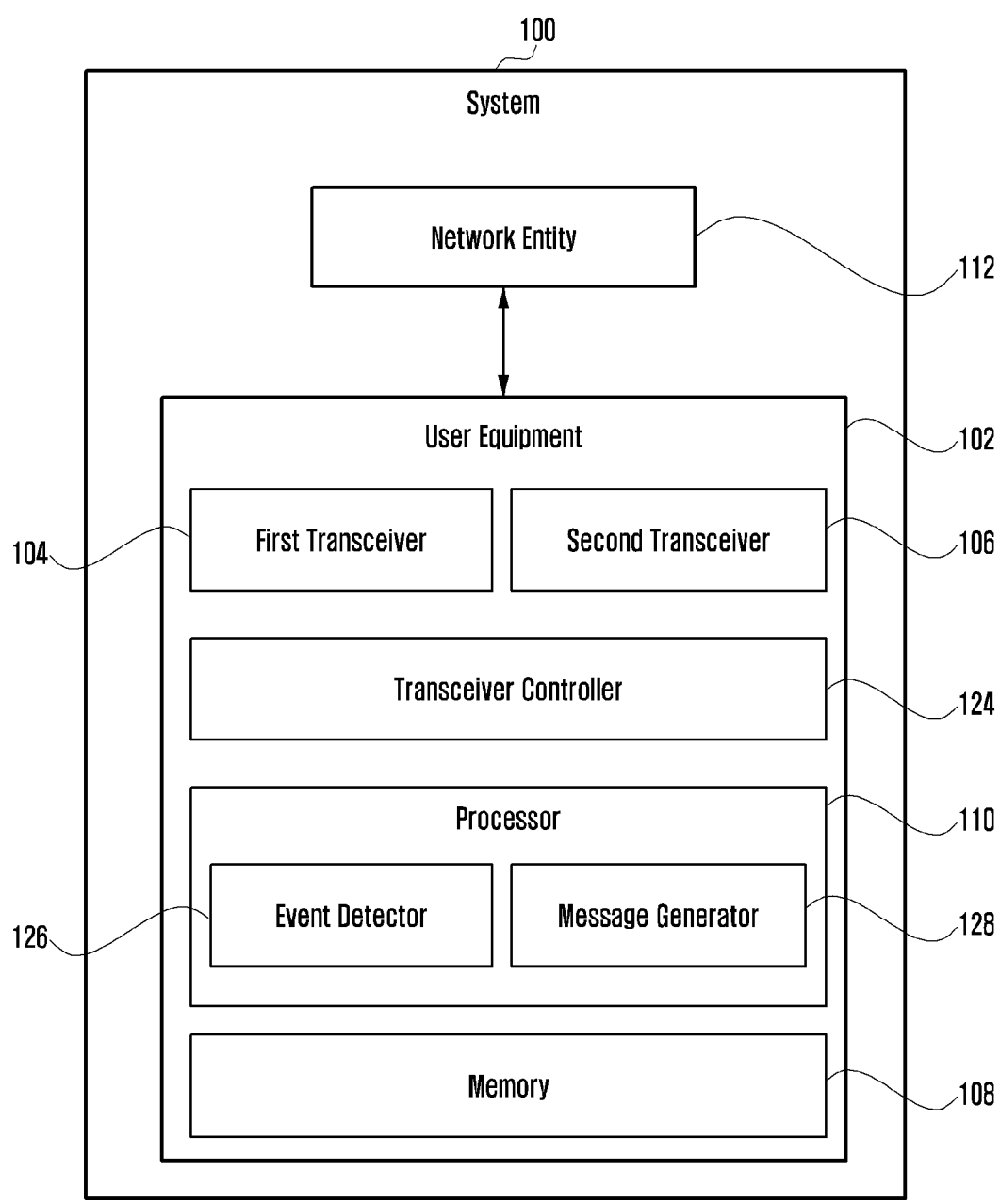
FIG. 1 illustrates a system for providing simultaneous voice and data services in an EN-DC capable UE, according to an embodiment as disclosed herein.

In general, there are many systems and wireless communication protocols available for managing connections between wireless communication devices and wireless networks. Conventional wireless communication systems utilizing technologies such as Global System for Mobile communications (GSM), Universal Mobile Telecommunications System (UMTS) or Long Term Evolution (LTE) allows the user equipment devices (UEs) to operate only on one technology at a time. However, latest EN-DC networks or fifth generation (5G) networks enable the EN-DC capable User Equipment (UEs) to connect to LTE and New Radio (NR) or 5G simultaneously. Typical EN-DC capable UE has two transceivers, one for wireless communication using LTE or fourth generation (4G) technology and a second for wireless communication using 5G technology. The simultaneous use of the two transceivers allows the EN-DC capable UE to exchange data between an NR base station and the UE along with simultaneous connection of the UE to an LTE base station.

In case a mobile service provider does not support voice over LTE (VOLTE), the typical EN-DC capable UE using the mobile service provider is mandated to operate in a single radio long term evolution (SRLTE) mode of operation. In SRLTE mode of operation, the EN-DC capable UE is connected to a network entity using the first transceiver, which is configured to provide 1× voice and 4G data services, one at a time. During a voice call, the first transceiver in the EN-DC capable UE operating in the SRLTE mode is utilized for the voice call and the 4G data services are interrupted during the call. The 4G data services in the EN-DC capable UE operating in the SRLTE mode are reinstated as soon as the voice call ends. Thus, during the SRLTE mode of operation, the EN-DC capable UEs can only access either voice or data as the simultaneous operation of both the transceivers are not defined using existing systems and associated network configurations. In addition, the EN-DC capable UEs operating in the SRLTE mode are not configured to provide 5G services as well. The existing systems involving the EN-DC capable UEs do not allow the utilization of the second transceiver for data services during the SRLTE mode of operation of the EN-DC capable UEs even though there is no hardware limitation on the second transceiver for operating in 4G/5G mode.

The proposed system and method addresses the above said problems and disadvantages or other shortcomings of the EN-DC capable UEs operating in the SRLTE mode and suggests a useful alternative to provide simultaneous voice and data services.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a system and associated method for providing simultaneous voice and data services in an Evolved-Universal Terrestrial Radio Access Network New Radio-Dual Connectivity (EN-DC) capable User Equipment (UE) having at least two transceivers. The system comprises a UE operating in the EN-DC mode and configured to determine whether a Voice over Long Term Evolution (VOLTE) service is available. If the EN-DC service is not supported by the network, the UE is configured to send an indication to a network entity that that EN-DC capability of the UE is disabled and the UE automatically switches from the EN-DC mode to a Single Radio Long Term Evolution (SRLTE)-ENDC mode in response to determining that the VOLTE is unavailable while the UE is operating in the EN-DC mode. Further, in the SRLTE-ENDC mode of operation, the UE configures a first transceiver (Tx1) of the at least two transceivers for both the voice and data services and a second transceiver (Tx2) of the at least two transceivers for a data service. Further, the UE is configured to automatically switch from the SRLTE-ENDC mode to the EN-DC mode when the UE detects that the VOLTE is available while operating in the SRLTE-ENDC mode.

Referring now to the drawings, and more particularly to FIGS. 1 through 9, where similar reference characters denote corresponding features consistently throughout the figures, there are shown preferred embodiments.

FIG. 1 illustrates a system 100 for providing simultaneous voice and data services in an EN-DC capable UE 102. The UE 102 includes two transceivers such as a first transceiver 104 and a second transceiver 106, a memory 108 and a processor 110 in communication with the memory 108. The processor 110 is further configured to control operations of the first transceiver 104 and the second transceiver 106 through a transceiver controller 124. The system 100 further includes a network entity 112 connected to the UE 102 using one or more radio. The network entity 112 is configured to communicate with the first transceiver 104 and the second transceiver 106 of the UE 102 using a first radio and a second radio for providing voice and data services through the UE 102. The processor 110 associated with the UE 102 further includes an event detector 126 and a message generator 128. The event detector 126 is configured to detect one or more events such as a voice call or SCG Failure) while the UE 102 is operating in an idle mode. In some instances, the event includes receiving a voice call at the first transceiver 104 of the UE 102 or the SCG failure on the second transceiver 106 or both. Further, the message generator 128 is operationally coupled to the event detector 126. The event detector 126 detects the one or more events at the UE 102 and signals the message generator 128 to indicate the network entity 112 upon detecting the events.

In one embodiment, the EN-DC capable UE 102 is configured to provide voice and 5G data services. In such an embodiment, the network entity 112 is configured to communicate with the first transceiver 104 and the second transceiver 106 of the UE 102 through one or more radio based on fourth generation (4G) and fifth generation (5G) technology to provide voice and 5G data services at the UE 102. When the UE 102 operates in the EN-DC mode, the transceiver controller 124 configures the first transceiver 104 of the UE 102 to operate using the first radio based on 4G technology to provide voice and 4G data services and the second transceiver 106 is configured to operate using the second radio based on 5G technology to provide 5G data.

In some embodiment, certain networks require the UEs 102 operating in the EN-DC mode to switch to SRLTE mode when the UEs 102 enters the network. When the UE 102 enters such network, the UE 102 sends an attach request or a tracking area update request message to the network entity 112 and automatically registers to the network by setting a Dual Connectivity-New Radio (DCNR) bit to 'dual connectivity with NR supported' in the UE network capability IE of the attach request or the tracking area update request message capability bit. In such an instance, the transceiver controller 124 configures the first transceiver 104 of the UE 102 to operate using the first radio based on 4G technology to provide voice and 4G data services and the second transceiver 106 for the 5G data service. During a 1× idle mode of operation, the UE 102 provides 4G/5G services through the first transceiver 104 or 5G services through the second transceiver 106. Upon detecting an event such as a voice call, the UE 102 provides voice services based on VOLTE and 4G data services simultaneously though the first transceiver 104 or 5G services through the second transceiver 106.

In some embodiments, certain networks do not support VOLTE and requires the UEs 102 operating in the EN-DC mode to switch to the SRLTE mode when the UEs 102 enters the network. When the UE 102 enters such network without VOLTE support, an attach request or a tracking area update request message is sent by the UE 102 to the network entity 112 and automatically registers to the network by setting the DCNR bit to 'dual connectivity with NR supported' in the UE network capability IE of the attach request or the tracking area update request message capability bit. In such an instance, the transceiver controller 124 configures the first transceiver 104 of the UE 102 to operate using the first radio based on 4G technology to provide voice or 4G data services, one at a time, as VOLTE is not supported by the network and the second transceiver 106 is configured for the data service. The UE 102 in this configuration is configured to either provide voice or 4G/5G data services through the first transceiver 104 or provide 5G data services through the second transceiver 106. During a 1× idle mode of operation, the UE 102 provides 4G/5G services through the first transceiver 104 or 5G services through the second transceiver 106.

Upon detecting an event such as a voice call is being initiated at the UE 102, the processor 110 signals the transceiver controller 124 to configure the first transceiver 104 for the voice call and the 4G/5G data service using the first transceiver 104 is interrupted. In addition, when the event detector 126 detects the event such as the voice call is being initiated in the absence of VOLTE, the processor 110 instructs the message generator 128 to indicate the network entity 112 that the EN-DC capability of the UE 102 is disabled. Upon detecting that the VOLTE is unavailable UE 102 automatically switches from the EN-DC mode to the SRLTE-ENDC mode and the voice call on the first transceiver 104, the processor 110 instructs the message generator 128 to indicate the network entity that the EN-DC capability of the UE 102 is disabled. In the SRLTE-ENDC mode, the processor 110 instructs the transceiver controller 124 to configure the first transceiver 104 of the at least two transceivers for both the voice and data services and the second transceiver 106 for a data service, thereby configuring the transceivers for simultaneous voice and data services through the UE 102. In case, if the processor 110 detects that the VOLTE service is available while the UE 102 is operating in the SRLTE-ENDC mode, the processor 110 automatically switches from the SRLTE-ENDC mode back to the EN-DC mode. In an embodiment, the SRLTE-ENDC mode is a mode where when a 1× call is active, data does works on a 4G network and when the 1× Call is idle, data does works on both the 4G network and a 5G network in a split bearer configuration In one embodiment, the processor 110 configures the first transceiver 104 for both the voice and data services and the second transceiver 106 for the data service to provide simultaneous voice and data services through the UE 102 by performing one or more operations as discussed below. Upon determining an event such as a voice call, the processor 110 determines whether the data service is active at the UE 102. Upon determining that the data service is active while the voice call being initiated at the UE 102, the processor 110 sends a first TAU message indicating lack of EN-DC capability at the UE 102 after the connection is released and configures the voice call on the first transceiver 104 and the data service based on the first radio on the second transceiver 106, thus providing simultaneous voice and data services through the UE 102. Further, the processor 110 sends a second TAU message indicating availability of EN-DC capability at the UE 102 upon determining that the voice call is ended and the data service is active at the UE 102. When the processor 110 detects that the voice call is inactive and the data service is active, the processor 110 configures the data service based on the first radio back on the first transceiver 104 and a data service based on a second radio on the second transceiver 106.

In another embodiment, the processor 110 configures the first transceiver 104 for both the voice and data services and the second transceiver 106 for the data service to provide simultaneous voice and data services through the UE 102 by performing one or more operations as discussed below. Upon determining an event such as a voice call being initiated at the UE 102, the processor 110 determines whether the data service is active at the UE 102. If the data service is active while the voice call is being initiated at the UE 102, the processor 110 sends a Non-Access Stratum (NAS) message indicating lack of EN-DC capability at the UE 102 and configures the voice call on the first transceiver 104 and the data service based on the first radio on the second transceiver 106, thus providing simultaneous voice and data services through the UE 102. Further, the processor 110 sends a TAU message indicating availability of EN-DC capability at the UE 102 upon determining that the voice call is ended and the data service is active at the UE 102. When the processor 110 detects that the voice call is inactive and the data service is active, the processor 110 configures the data service based on the first radio back on the first transceiver 104 and a data service based on a second radio on the second transceiver 106.

In another embodiment, the processor 110 configures the first transceiver 104 for both the voice and data services and the second transceiver 106 for the data service to provide simultaneous voice and data services through the UE 102 by performing one or more operations as discussed below. Upon determining an event such as a voice call being initiated at the UE 102, the processor 110 determines whether the data service is active at the UE 102. If the data service is active while the voice call is being initiated at the UE 102, the processor 110 sends an extended service request to release at least one bearer corresponding to at least one radio and a first TAU message indicating lack of EN-DC capability at the UE 102 after the connection is released. Further, the processor 110 configures the voice call on the first transceiver 104 and the data service based on the first radio on the second transceiver 106, thus providing simultaneous voice and data services through the UE 102. Further, the processor 110 sends a second TAU message indicating availability of EN-DC capability at the UE 102 upon determining that the voice call is ended and the data service is active at the UE 102. When the processor 110 detects that the voice call is inactive and the data service is active, the processor 110 configures the data service based on the first radio back on the first transceiver 104 and a data service based on a second radio on the second transceiver 106.

In another embodiment, the processor 110 configures the first transceiver 104 for both the voice and data services and the second transceiver 106 for the data service to provide simultaneous voice and data services through the UE 102 by performing one or more operations as discussed below. Upon determining an event such as a voice call being initiated at the UE 102, the processor 110 determines whether the data service is active at the UE 102. If the data service is active while the voice call is being initiated at the UE 102, the processor 110 sends an SCG failure message on the at least one radio associated with the second transceiver 106. Further, the processor 110 configures the voice call on the first transceiver 104 and the data service based on the first radio on the second transceiver 106, thus providing simultaneous voice and data services through the UE 102. The processor 110 configures the second transceiver 106 to reject one or more configurations for the at least one radio associated with the second transceiver 106 while the voice call and the data service are active at the UE 102. Further, the processor 110 resumes the measurement reports for the bearers associated with the second transceiver 106 upon determining that the voice call is ended and the data service is active at the UE 102. When the processor 110 detects that the voice call is inactive and the data service is active, the processor 110 configures the data service based on the first radio back on the first transceiver 104 and a data service based on a second radio on the second transceiver 106.

Figure 2:
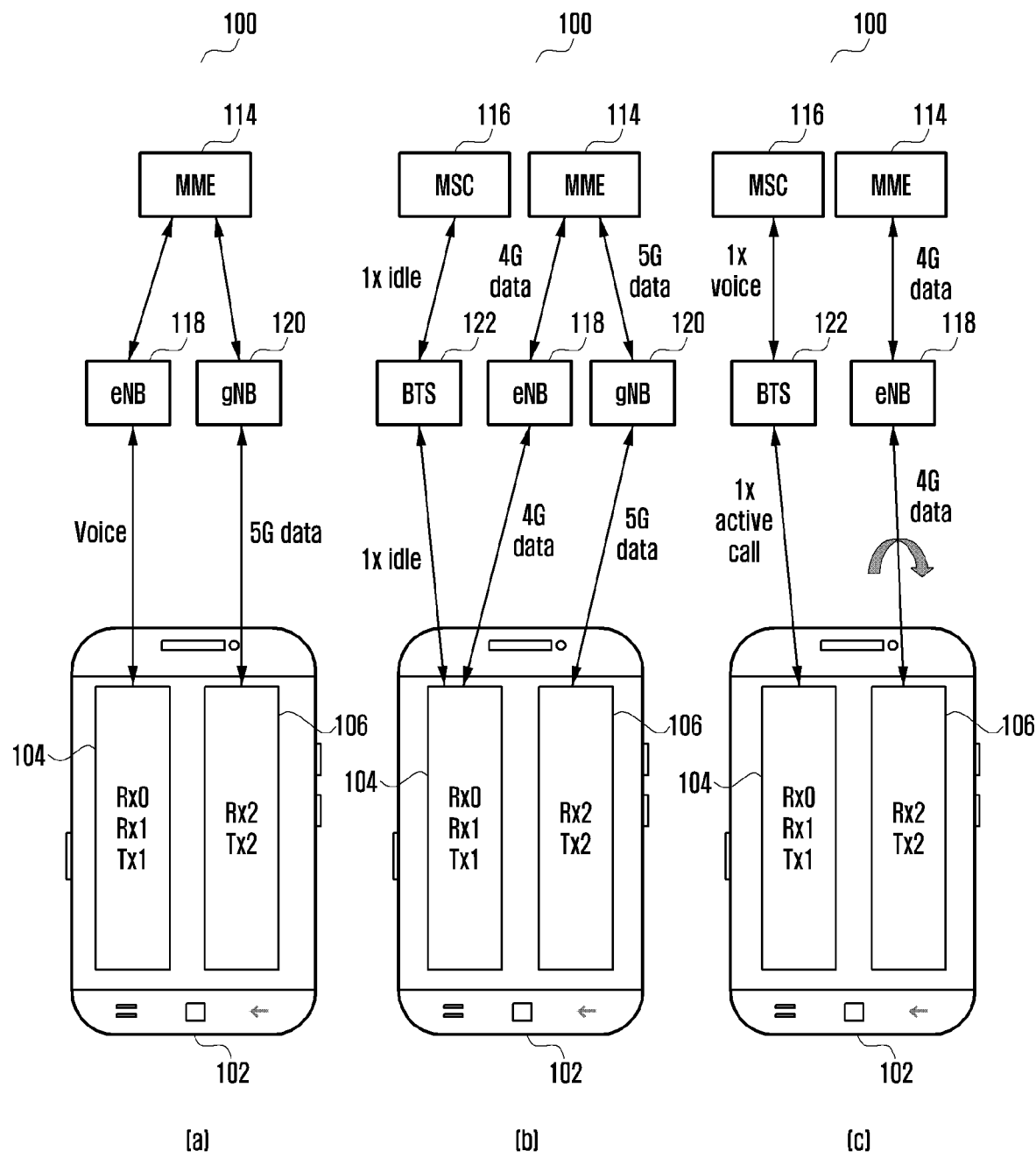
FIG. 2 illustrates configurations of the system for providing simultaneous voice and data services in an EN-DC capable UE during a transition of the UE from a 1× idle mode and to a 1× connected mode, according to an embodiment as disclosed herein.

FIG. 2 illustrates the configurations of the system 100 for providing simultaneous voice and data services through the UE 102 during a transition of the UE 102 from a 1× idle mode and to a 1× connected mode, according to one or more embodiments of the present disclosure. During EN-DC mode of operation, when there are no events detected by the UE 102, the first transceiver 104 of the UE 102 remains in 1× tune away and the second transceiver 106 remains configured for the 5G data service. This mode of operation is denoted as section (a) in FIG. 2 and the UE 102 operates in the EN-DC mode. During the EN-DC mode of operation, the first transceiver 104 in the UE 102 is connected to the LTE network node (eNB) 118 for providing voice services over VOLTE and the second transceiver 106 is connected to the 5G network node (gNB) 120 for providing 5G data services. The eNB 118 and the gNB 120 are connected to the mobility management entity (MME) 114 for providing simultaneous voice and 5G data services, when the UE 102 is in the EN-DC mode of operation with VOLTE service available at the first transceiver 104.

In a second mode, denoted as section (b) in FIG. 2, the UE 102 moves to a network where EN-DC mode of operation of the UE 102 is not supported. In response to determining that the EN-DC mode of operation of the UE 102 is not supported, the UE 10 switches to an SRLTE-ENDC mode of operation by indicating the network entity 112 that the EN-DC mode of operation is not supported. In an embodiment, the UE 102 indicates the network entity by sending an attach request or a tracking area update request message to the network entity 112 and automatically registers to the network by setting the DCNR bit to 'dual connectivity with NR supported. In SRLTE-ENDC mode of operation, the first transceiver 104 of the UE 102 is configured for voice and 4G data services and the second transceiver 106 is configured for the 5G data service. Further, in SRLTE-ENDC mode of operation, the first transceiver 104 is connected to the mobile switching center (MSC) 116 through the base transceiver station (BTS) 122 for receiving and initiating voice calls using the UE 102. Further, the first transceiver 104 also is connected to the MME 114 through the eNB 118 for providing 4G data service when there is no voice call on the first transceiver 104. Thus the first transceiver 104 of the UE 102 operating in SRLTE-ENDC mode remains in 1× tune away and 4G data service enabled configuration when there are no events detected by the UE 102. Whereas the second transceiver 106 on the UE 102 maintains connected to the MME 114 through the gNB 120 for providing 4G/5G data services.

In a third mode, denoted as section (c) in FIG. 2, the UE 102 is operating in the SRLTE-ENDC mode and provides simultaneous voice and data services when there is an event detected by the UE 102. When the UE 102 is operating in the SRLTE-ENDC mode and detects an event such as a voice call, the UE 102 indicates to the network entity 112 that the EN-DC capability of the UE 102 is disabled and configures the first transceiver 104 for the voice call. The transceiver controller 124 further configures the second transceiver 106 for the data services using 4G technology. The transceiver controller 124 of the UE 102 configures the second transceiver 106 to connect to the MME 114 through eNB 118 to provide 4G data services while the first transceiver 104 is utilized for the voice call. Thus the UE 102 provides simultaneous voice and 4G data services while the UE 102 is operating in the SRLTE-ENDC mode. As soon as the voice call ends and when the UE 102 detects that the VOLTE service available, the UE 102 automatically switches from the SRLTE-ENDC mode back to the EN-DC mode. Thus the UE 102, operating in SRLTE-ENDC mode, provides simultaneous voice and 4G data services by utilizing the two transceivers 104 and 106 when there is no support for VOLTE service by the network.

Figure 3:
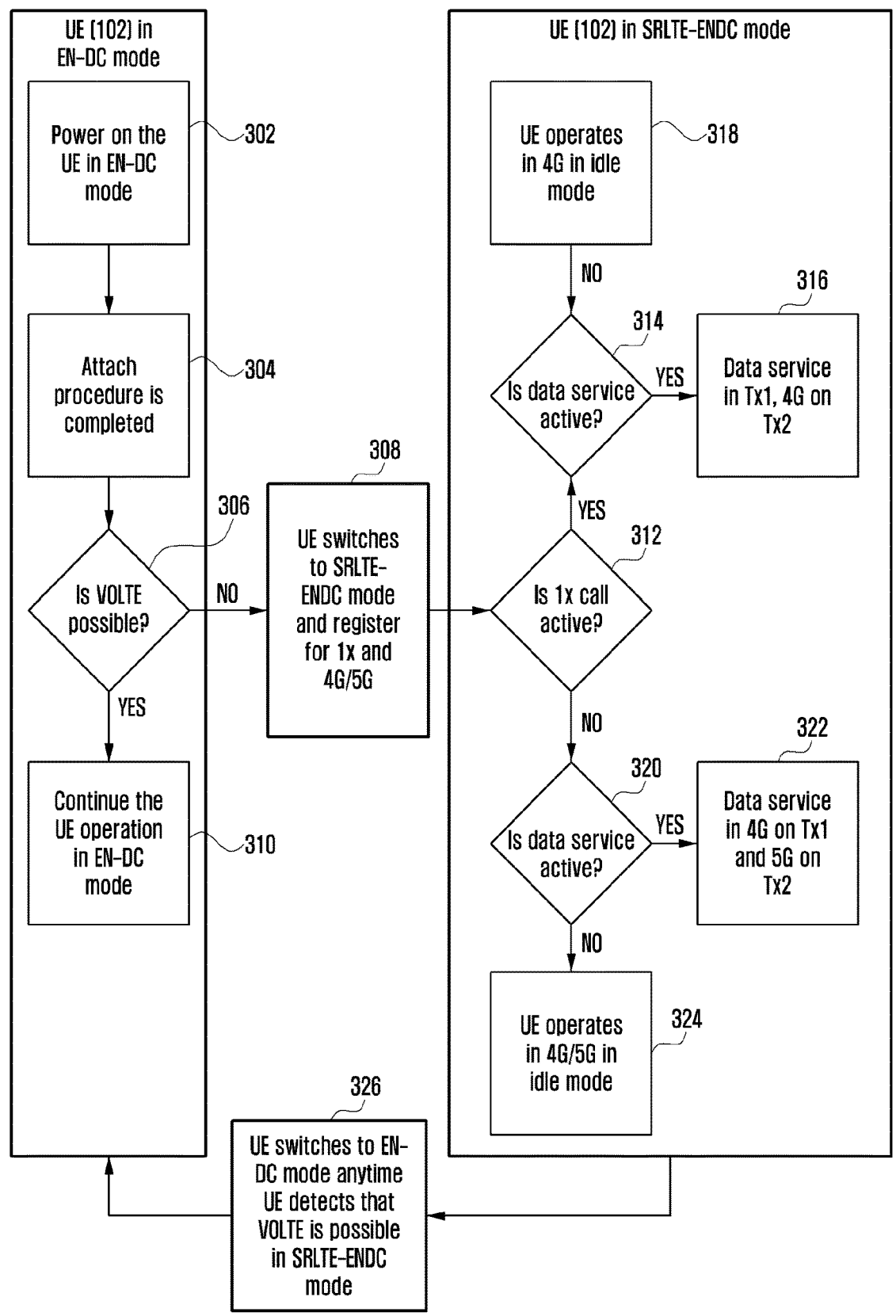
FIG. 3 is a flow diagram illustrating a method for providing simultaneous voice and data services in an EN-DC capable UE in a 1× idle mode and 1× connected mode, according to an embodiment as disclosed herein.

FIG. 3 is a flow diagram illustrating a method for providing simultaneous voice and data services in an EN-DC capable UE 102 operating in a 1× idle mode and in 1× connected mode, according to one or more embodiment of the present disclosure. The EN-DC capable UE 102 is provided with two transceivers such as the first transceiver 104 configured for voice and data services using 4G technology and the second transceiver 106 configured for data service using 4G and 5G technologies. When the UE 102 operating in EN-DC mode is powered on, as in step 302, the two transceivers of the UE 102 communicates with the MME 114 or the associated network entity 112 to perform 4G/5G attach procedure to the MME 114 with the EN-DC capability of the UE 102 enabled, as in step 304. During the attach procedure, the first transceiver 104 of the UE 102 connects to the network entity 112 using at least one radio based on 4G technology to provide voice and data services and the second transceiver 106 of the UE 102 is connected to the network entity 112 using at least one radio based on 5G technology to provide data services.

Once the attach procedure in step 304 is completed, the UE 102 determines whether VOLTE is supported by the network, as in step 306. If the network allows VOLTE service, the UE 102 continues to operate in the EN-DC mode with the first transceiver 104 configured for voice and 4G data services and the second transceiver 106 configured for the 5G data services, as in step 310. If the network does not support VOLTE services, then the UE 102 automatically switches to SRLTE-ENDC mode and registers the first transceiver 104 for 1× voice and 4G data services and the second transceiver 106 for the 4G/5G data service, as in step 308.

During the SRLTE-ENDC mode of operation, the UE 102 is configured to provide 4G data services through the first transceiver 104 and the 5G data services through the second transceiver 106 when there is no voice call. Further, during the SRLTE-ENDC mode of operation, the UE 102 detects or checks whether the voice call is active at the UE 102, as in step 312. If the UE 102 detects that there are no active voice call and no active data services using the first transceiver 104 and the second transceiver 106 in step 320, the UE 102 remains in 4G/5G idle mode as in step 324. In case, if there is no active voice call, detected in step 312, and the UE 102 provides active data service, detected in step 320, then the UE 102 continues operate in SRLTE-ENDC mode to provide 4G data services through the first transceiver 104 and 5G data through the second transceiver 106, as in step 322. In case, the UE 102 receives a voice call, detected in step 312, and if there is no active data service using the first transceiver 104 and the second transceiver 106, detected in step 314, the UE 102 allocates the first transceiver 104 for the voice call and the second transceiver 106 is maintained in an idle mode of operation, as in step 318. When the UE 102 detects an event such as a voice call, in step 312, and if the 4G/5G data service is active, detected in step 314, then the UE 102 indicates to the network entity 112 that the EN-DC capability of the UE 102 is disabled and allocates the first transceiver 104 for the voice call and the second transceiver 106 for the 4G data service, as in step 316. As soon as the voice call ends or when the UE 102 detects that VOLTE is available, the UE 102 automatically switches from the SRLTE-ENDC mode back to the EN-DC mode, as in step 326. Thus the UE 102, operating in SRLTE-ENDC mode, provides simultaneous voice and data services by utilizing the first transceiver 104 for the voice service and the second transceiver 106 for 4G data service when there is no support for VOLTE by the network.

Figure 4:
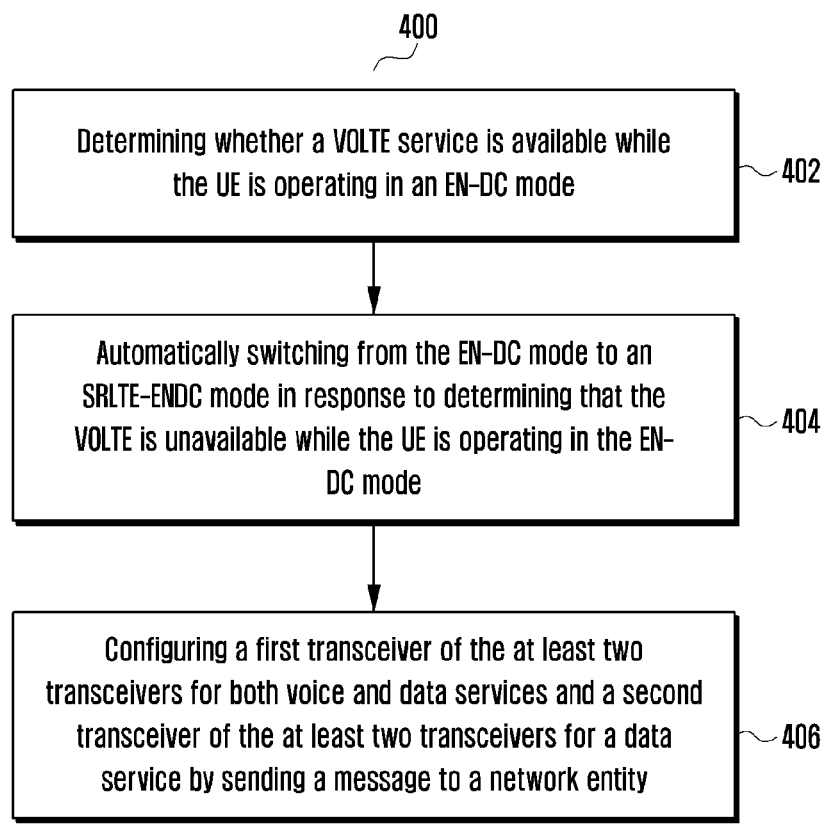
FIG. 4 is a flow diagram illustrating a method for providing voice and data services simultaneously in EN-DC capable UE comprising at least two transceivers, according to an embodiment as disclosed herein.

FIG. 4 is a flow diagram 400 illustrating a method for providing simultaneous voice and data services in the EN-DC capable UE 102 operating in an SRLTE-ENDC mode utilizing the first transceiver 104 and the second transceiver 106 of the UE 102, according to an embodiment. The method includes determining whether a VOLTE service is available while the UE 102 is operating in the EN-DC mode, as in block 402. If the VOLTE service is not supported by the network, the UE 102 is configured to automatically switch from the EN-DC mode to the SRLTE-ENDC mode while the UE 102 is operating in the EN-DC mode, as shown in block 404. In the SRLTE-ENDC mode, the UE 102 configures the first transceiver 104 for both voice and data services and the second transceiver 106 for data service as in block 406. The block 402 of the flow diagram 400 further includes steps such as detecting an event including a voice call at the first transceiver 104 or a SCG failure on the second transceiver 106 by the UE 102 while operating in the EN-DC mode and determining the availability of VOLTE service at the UE 102 based on the event such as the voice call on the first transceiver 104. Further, the block 404 includes additional steps such as indicating to the network entity 112, upon detecting the event, that the EN-DC capability of the UE 102 is disabled. The UE 102 indicates to the network entity 112 that the EN-DC capability of the UE 102 is disabled and automatically switches from the EN-DC mode to the SRLTE-ENDC mode, as in block 404. In one or more embodiment, the UE 102 indicates to the network entity 112 that the EN-DC capability of the UE 102 is disabled and automatically switches from the EN-DC mode to the SRLTE-ENDC mode in a number of steps, which are discussed in FIG. 6 to FIG. 9.

Further, the block 406 include additional steps such as determining whether a voice call and data service are active at the UE 102, configuring the voice call on the first transceiver 104 and the data service based on the first radio on the second transceiver 106 in response to determining that both the voice call and the data service are active and configuring the data service based on the first radio on the first transceiver 104 and the data service based on the second radio on the second transceiver 106 in response to determining that the voice call is inactive and the data service is active at the UE 102. In certain instance, the first radio available for communication at the first transceiver 104 is for 4G communication and voice call. In another instance, the second radio available for communication at the second transceiver 106 is for 4G and 5G communication.

Figure 5:
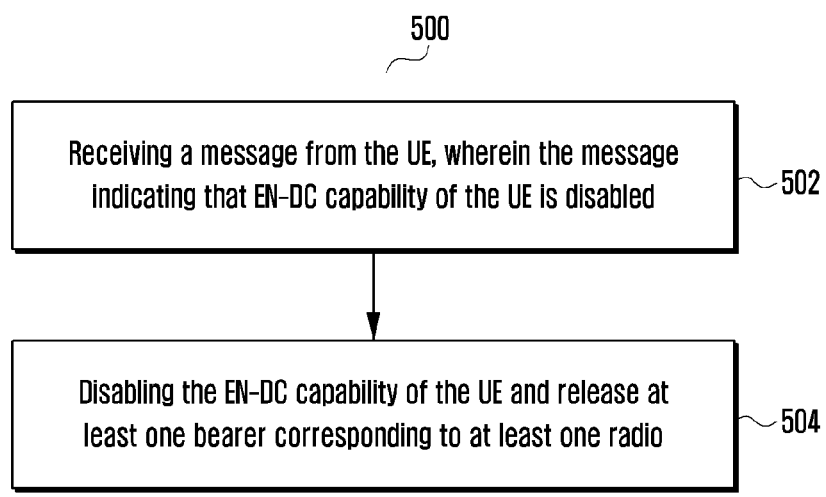
FIG. 5 is a flow diagram illustrating a method for providing voice and data services simultaneously in an EN-DC network comprising a network entity connected to an EN-DC capable UE, according to an embodiment as disclosed herein.

FIG. 5 is a flow diagram 500 illustrating a method for providing simultaneous voice and data services in an EN-DC network having the network entity 112 connected to the EN-DC capable UE 102, according to an embodiment of the present disclosure. The method includes the steps of receiving the indication message from the UE 102 at the network entity 112, as in block 502. In one embodiment, the network entity 112 receives the indication message from UE 102 that the EN-DC capability of the UE 102 is disabled. In certain embodiments, the network entity 112 receives the indication message when the UE 102 detects an event such as a voice call at the first transceiver 104 or an SCG failure on the second transceiver 106. Upon receiving the indication message from the UE 102 indicating that the EN-DC capability of the UE 102 is disabled, the network entity 112 releases at least one bearer corresponding to at least one radio used for communication with the UE 102, as in block 504. In a certain embodiment, the network entity 112 disables the radio associated with the second transceiver 106 for disabling the 5G capabilities so that the transceiver controller 124 at the UE 102 configures the second transceiver 106 to operate on the first radio to provide 4G data service while using the first transceiver 104 for the voice call. In another embodiment, the network entity 112 disables the radios associated with the first transceiver 104 and the second transceiver 106 for disabling the 4G and 5G capabilities so that the transceiver controller 124 at the UE 102 configures the second transceiver 106 to operate on the first radio to provide 4G data service while allocating the first transceiver 104 for the voice call.

Figure 6:
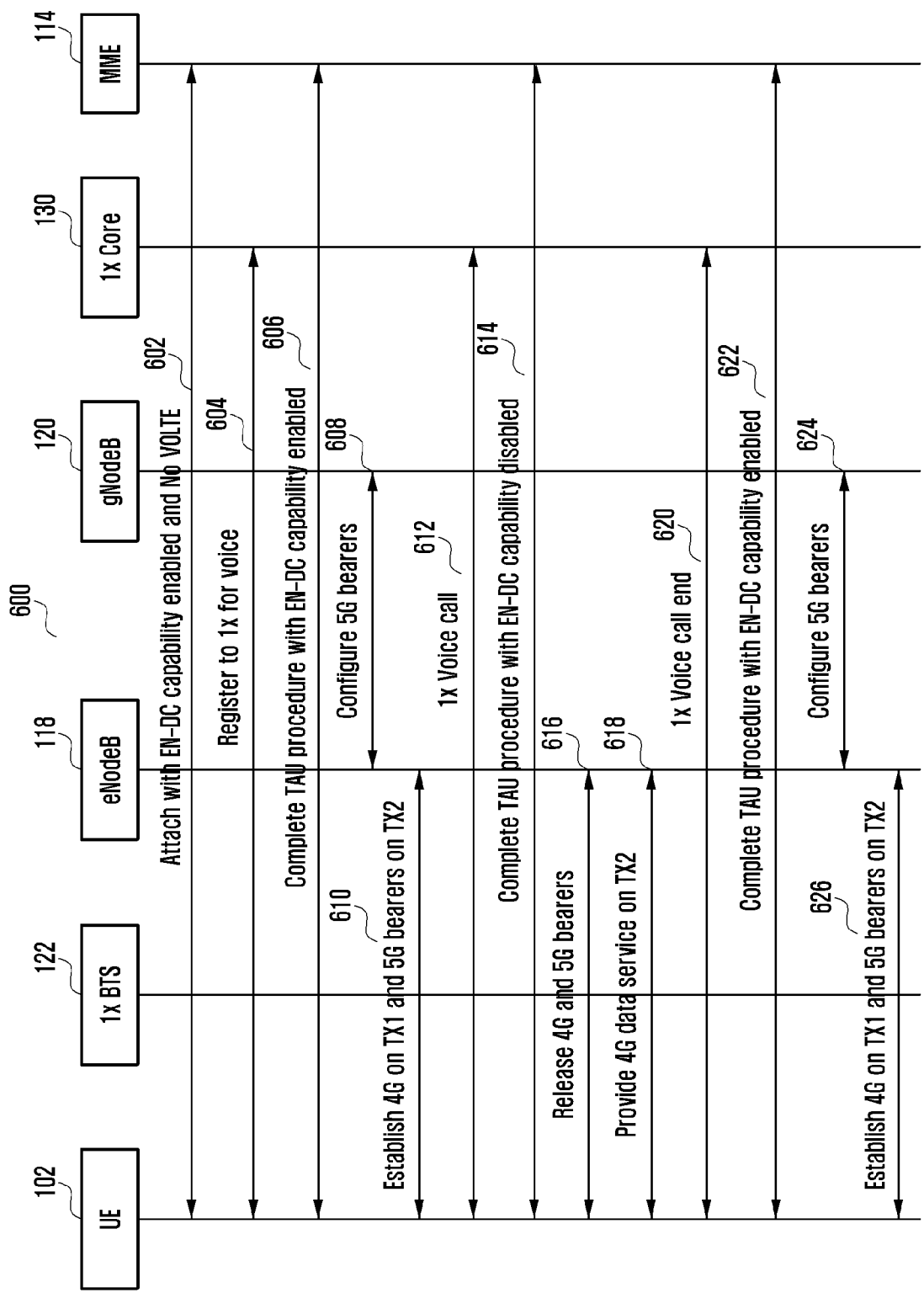
FIG. 6 is a connection sequence diagram illustrating a sequence of steps for providing simultaneous voice and data services using an EN-DC capable UE during a 1× idle mode and a 1× connected mode of operation, according to an embodiment as disclosed herein.

FIG. 6 is a connection sequence diagram 600 illustrating a sequence of steps for providing simultaneous voice and data services using an EN-DC capable UE 102 during a 1× idle mode and a 1× connected mode of operation, according to an embodiment as disclosed herein. In some embodiment, certain networks operating on CDMA network technology requires the UEs 102 operating in the EN-DC mode to switch to SRLTE mode when the UEs 102 operating in EN-DC mode enters the network. When the UE 102 enters such network, the UE 102 sends an attach request or a tracking area update request message to the MME 114 and automatically registers to the network by setting a Dual Connectivity-New Radio (DCNR) bit to 'dual connectivity with NR supported' in the UE network capability IE of the attach request or the tracking area update request message capability bit, as in step 602. Further, the UE 102 determines whether VOLTE service is available while the UE 10 is operating in the EN-DC mode. Upon detecting that VOLTE is unavailable, the UE 102 switches to SRLTE-ENDC mode and in order to provide simultaneous voice and data service. The UE 102 registers to the 1× core 130 for providing 1× voice using the EN-DC capable UE 102, in step 604. The UE 102 also utilizes the first transceiver 104 registered to the 1× voice for monitoring paging operation and completes a TAU procedure involving the MME 114 with EN-DC capability enabled at the UE 102, as in step 606. The network involving the eNodeB or eNB 118 and gNodeB or gNB 120 further configures the 5G bearer on the second transceiver 106 of the UE 102, as in step 608.

Thus in an 1× idle mode of operation, the UE 102 configures the first transceiver 104 for 1× voice and 4G data services and the second transceiver 106 is configured for the 5G data service, as in step 610. In step 612, the UE 102 detects an event, such as a mobile originating (MO) or mobile terminating (MT) 1× call on the first transceiver 104. Upon detecting the event, the UE 102 sends a TAU message to the MME 114 indicating that EN-DC capability of the UE 102 is disabled by setting the DCNR bit to 'dual connectivity with NR not supported mode' in the TAU message, as in step 614. This disables the 5G capability between the UE 102 and the network. Further, upon receiving the indication that the EN-DC capability of the UE 102 is disabled in the TAU message, the network entity 112 releases the 4G and 5G bearers as in step 616. In order to provide simultaneous voice and data services, the transceiver controller 124 of the UE 102 allocates the second transceiver 106 for the data services, as in step 618. In one instance, the UE 102 provides 4G data services using the second transceiver 106 operating on the first radio while the first transceiver 104 is used for the 1× voice through the 1× BTS 122.

In step 620, the UE 102 detects that the voice call on the first transceiver 104 has ended. Now in step 622, upon detecting that the voice call has ended, the UE 102 sends a TAU message to the network entity 112 or the MME 114 to enable the 5G capabilities by setting a DCNR bit to 'dual connectivity with NR supported mode' in the TAU message sent to the network entity 112 or the MME 114. Further, the UE 102 automatically switches from the SRLTE-ENDC mode to the EN-DC mode in response to determining that the VOLTE is available while the UE 102 is operating in the SRLTE-ENDC mode. Upon receiving the TAU message indicating that the EN-DC capability of the UE 102 is enabled, the network further configures the 5G bearer on the second transceiver 106 of the UE 102, as in step 624. In the EN-DC mode, the UE 102 configures the first transceiver 104 for voice and 4G data services and the second transceiver 106 for the 5G data service, as in step 626.

Figure 7:
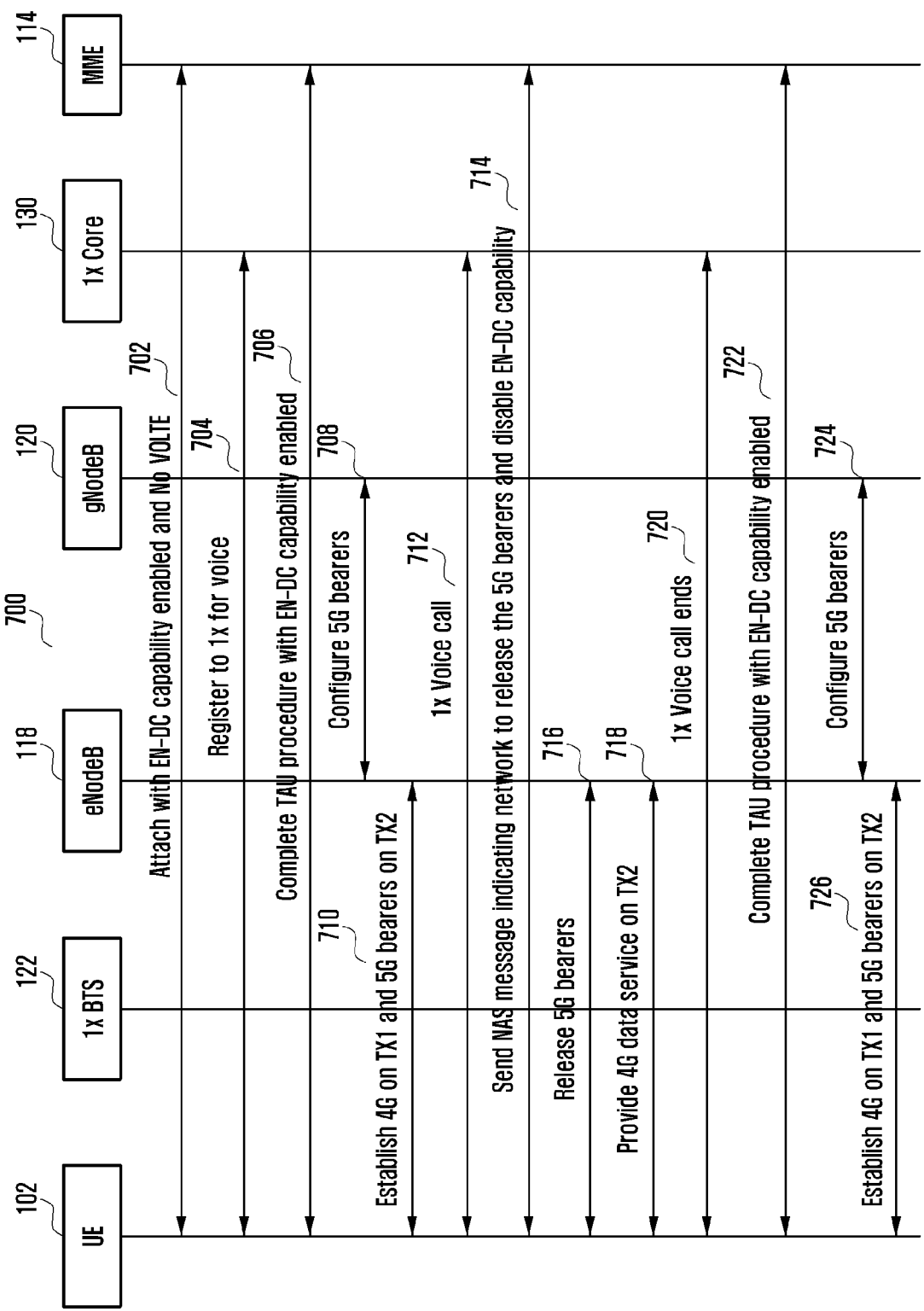
FIG. 7 is a connection sequence diagram illustrating a sequence of steps for providing simultaneous voice and data services using an EN-DC capable UE during a 1× idle mode and a 1× connected mode of operation, according to an embodiment as disclosed herein.

FIG. 7 is a connection sequence diagram 700 illustrating a sequence of steps for providing simultaneous voice and data services using an EN-DC capable UE 102 during a 1× idle mode and a 1× connected mode of operation, according to an alternate embodiment as disclosed herein. In some embodiment, certain networks operating on CDMA network technology requires the UEs 102 operating in the EN-DC mode to switch to SRLTE mode when the UEs 102 operating in EN-DC mode enters the network. When the UE 102 enters such network, the UE 102 sends an attach request or a tracking area update request message to the MME 114 and automatically registers to the network by setting a Dual Connectivity-New Radio (DCNR) bit to 'dual connectivity with NR supported' in the UE network capability IE of the attach request or the tracking area update request message capability bit, as in step 702. Further, the UE 102 determines whether VOLTE service is available while the UE 10 is operating in the EN-DC mode. Upon detecting that VOLTE is unavailable, the UE 102 switches to SRLTE-ENDC mode and in order to provide simultaneous voice and data service. The UE 102 registers to the 1× core 130 for providing 1× voice using the EN-DC capable UE 102, in step 704. The UE 102 also utilizes the first transceiver 104 registered to the 1× voice for monitoring paging operation and completes a TAU procedure involving the MME 114 with EN-DC capability enabled at the UE 102, as in step 706. The network involving the eNodeB or eNB 118 and gNodeB or gNB 120 further configures the 5G bearer on the second transceiver 106 of the UE 102, as in step 708.

Thus in an 1× idle mode of operation, the UE 102 configures the first transceiver 104 for 1× voice and 4G data services and the second transceiver 106 is configured for the 5G data service, as in step 710. In step 712, the UE 102 detects an event, such as a mobile originating (MO) or mobile terminating (MT) 1× call on the first transceiver 104 with the 1× core 130 involved. Upon detecting the event, the UE 102 sends a NAS message to the MME 114 indicating that EN-DC capability of the UE 102 is disabled by setting the DCNR bit to 'dual connectivity with NR not supported mode' in the NAS message and to release the 5G bearers, as in step 714. This disables the 5G capability between the UE 102 and the network. Further, upon receiving the indication that the EN-DC capability of the UE 102 is disabled in the NAS message, the network entity 112 releases the 4G and 5G bearers as in step 716. In order to provide simultaneous voice and data services, the transceiver controller 124 of the UE 102 allocates the second transceiver 106 for the data services, as in step 718. In one instance, the UE 102 provides 4G data services using the second transceiver 106 operating on the first radio while the first transceiver 104 is used for the 1× voice.

In step 720, the UE 102 detects that the voice call on the first transceiver 104 has ended. Now in step 722, upon detecting that the voice call has ended, the UE 102 sends a TAU message to the network entity 112 or the MME 114 to enable the 5G capabilities by setting a DCNR bit to 'dual connectivity with NR supported mode' in the TAU message sent to the network entity 112 or the MME 114. Further, the UE 102 automatically switches from the SRLTE-ENDC mode to the EN-DC mode in response to determining that the VOLTE is available while the UE 102 is operating in the SRLTE-ENDC mode. Upon receiving the TAU message indicating that the EN-DC capability of the UE 102 is enabled, the network further configures the 5G bearer on the second transceiver 106 of the UE 102, as in step 724. In the EN-DC mode, the UE 102 configures the first transceiver 104 for voice and 4G data services and the second transceiver 106 for the 5G data service, as in step 726.

FIG. 8 is a connection sequence diagram 800 illustrating a sequence of steps for providing simultaneous voice and data services using an EN-DC capable UE during a 1× idle mode and a 1× connected mode of operation, according to an embodiment as disclosed herein. In some embodiment, certain networks operating on CDMA network technology requires the UEs 102 operating in the EN-DC mode to switch to SRLTE mode when the UEs 102 operating in EN-DC mode enters the network. When the UE 102 enters such network, the UE 102 sends an attach request or a tracking area update request message to the MME 114 and automatically registers to the network by setting a Dual Connectivity-New Radio (DCNR) bit to 'dual connectivity with NR supported' in the UE network capability IE of the attach request or the tracking area update request message capability bit, as in step 802. Further, the UE 102 determines whether VOLTE service is available while the UE 10 is operating in the EN-DC mode. Upon detecting that VOLTE is unavailable, the UE 102 switches to SRLTE-ENDC mode and in order to provide simultaneous voice and data service. The UE 102 registers to the 1× core 130 for providing 1× voice using the EN-DC capable UE 102, in step 804. The UE 102 also utilizes the first transceiver 104 registered to the 1× voice for monitoring paging operation and completes a TAU procedure involving the MME 114 with EN-DC capability enabled at the UE 102, as in step 806. The network involving the eNodeB or eNB 118 and gNodeB or gNB 120 further configures the 5G bearer on the second transceiver 106 of the UE 102, as in step 808.

Thus in an 1× idle mode of operation, the UE 102 configures the first transceiver 104 for 1× voice and 4G data services and the second transceiver 106 is configured for the 5G data service, as in step 810. In step 812, the UE 102 detects an event, such as a mobile originating (MO) or mobile terminating (MT) 1× call on the first transceiver 104 with the 1× core 130 involved. Upon detecting the event, the UE 102 sends an extended service request message to the MME 114 indicating to release the 4G and 5G bearers, as in step 814. Further, upon receiving the extended service request message, the network entity 112 releases the 4G and 5G bearers as in step 716. This disables the 4G and 5G capability between the UE 102 and the network. In order to provide simultaneous voice and data services, the transceiver controller 124 of the UE 102 allocates the second transceiver 106 for the data services, as in step 818. In one instance, the UE 102 provides 4G data services using the second transceiver 106 operating on the first radio while the first transceiver 104 is used for the 1× voice.

In step 820, the UE 102 detects that the voice call on the first transceiver 104 has ended. Now in step 822, upon detecting that the voice call has ended, the UE 102 sends a TAU message to the network entity 112 or the MME 114 to enable the 5G capabilities by setting a DCNR bit to 'dual connectivity with NR supported mode' in the TAU message sent to the network entity 112 or the MME 114. Further, the UE 102 automatically switches from the SRLTE-ENDC mode to the EN-DC mode in response to determining that the VOLTE is available while the UE 102 is operating in the SRLTE-ENDC mode. Upon receiving the TAU message indicating that the EN-DC capability of the UE 102 is enabled, the network further configures the 5G bearer on the second transceiver 106 of the UE 102, as in step 824. In the EN-DC mode, the UE 102 configures the first transceiver 104 for voice and 4G data services and the second transceiver 106 for the 5G data service, as in step 826.

FIG. 9 is a connection sequence diagram 900 illustrating a sequence of steps for providing simultaneous voice and data services using an EN-DC capable UE during a 1× idle mode and a 1× connected mode of operation, according to an embodiment as disclosed herein. In some embodiment, certain networks operating on CDMA network technology requires the UEs 102 operating in the EN-DC mode to switch to SRLTE mode when the UEs 102 operating in EN-DC mode enters the network. When the UE 102 enters such network, the UE 102 sends an attach request or a tracking area update request message to the MME 114 and automatically registers to the network by setting a Dual Connectivity-New Radio (DCNR) bit to 'dual connectivity with NR supported' in the UE network capability IE of the attach request or the tracking area update request message capability bit, as in step 902. Further, the UE 102 determines whether VOLTE service is available while the UE 10 is operating in the EN-DC mode. Upon detecting that VOLTE is unavailable, the UE 102 switches to SRLTE-ENDC mode and in order to provide simultaneous voice and data service. The UE 102 registers to the 1× core 130 for providing 1× voice using the EN-DC capable UE 102, in step 904. The UE 102 also utilizes the first transceiver 104 registered to the 1× voice for monitoring paging operation and completes a TAU procedure involving the MME 114 with EN-DC capability enabled at the UE 102, as in step 906. The network involving the eNodeB or eNB 118 and gNodeB or gNB 120 further configures the 5G bearer on the second transceiver 106 of the UE 102, as in step 908.

Thus in an 1× idle mode of operation, the UE 102 configures the first transceiver 104 for 1× voice and 4G data services and the second transceiver 106 is configured for the 5G data service, as in step 910. In step 912, the UE 102 detects an event, such as a mobile originating (MO) or mobile terminating (MT) 1× call on the first transceiver 104 with the 1× core 130 involved. Upon detecting the event, the UE 102 triggers an SCG Failure on the second transceiver 106 and indicates the MME 114 to release the 5G bearers and to disable the EN-DC capability of the UE 102, as in step 914. The UE 102 also configures the second transceiver 106 to not to send any measurement reports for the 5G cells as in step 916. In addition, the UE 102 rejects any blind configurations for the 5G on the second transceiver 106 by the network, as in step 918. In order to provide simultaneous voice and data services, the transceiver controller 124 of the UE 102 allocates the second transceiver 106 for the data services, as in step 920. In one instance, the UE 102 provides 4G data services using the second transceiver 106 operating on the first radio while the first transceiver 104 is used for the 1× voice.

In step 922, the UE 102 detects that the voice call on the first transceiver 104 has ended. Now in step 924, upon detecting that the voice call has ended, the UE 102 sends a TAU message to the network entity 112 or the MME 114 to enable the 5G capabilities by setting a DCNR bit to 'dual connectivity with NR supported mode' in the TAU message sent to the network entity 112 or the MME 114. Further, the UE 102 automatically switches from the SRLTE-ENDC mode to the EN-DC mode in response to determining that the VOLTE is available while the UE 102 is operating in the SRLTE-ENDC mode. Upon receiving the TAU message indicating that the EN-DC capability of the UE 102 is enabled, the network further configures the 5G bearer on the second transceiver 106 of the UE 102, as in step 926. In the EN-DC mode, the UE 102 configures the first transceiver 104 for voice and 4G data services and the second transceiver 106 for the 5G data service, as in step 928.

Thus the methods and system disclosed herein provide a method and system for providing simultaneous voice and data services in an EN-DC capable UE 102 having at least two transceivers 104, 106. The UE 102 operating in the EN-DC mode determines whether a VOLTE service is available. If the EN-DC service is not supported by the network, the UE 102 indicates to the network entity that that EN-DC capability of the UE 102 is disabled and the UE 102 automatically switches from the EN-DC mode to SRLTE-ENDC mode in response to determining that the VOLTE is unavailable while the UE 102 is operating in the EN-DC mode. Further, in the SRLTE-ENDC mode of operation, the UE 102 configures the first transceiver 104 of the at least two transceivers for both the voice and data services and the second transceiver 106 of the at least two transceivers for data service, thereby providing simultaneous voice and data through the UE 102. Further, the UE 102 automatically switches from the SRLTE-ENDC mode back to the EN-DC mode when the UE detects that the VOLTE is available while operating in the SRLTE-ENDC mode.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for providing voice and data services simultaneously in an Evolved-Universal Terrestrial Radio Access Network New Radio-Dual Connectivity (EN-DC) capable User Equipment (UE) comprising at least two transceivers, wherein the method comprising:

determining, by the UE, whether a Voice over Long Term Evolution (VOLTE) service is supported by a network entity while the UE is operating in an EN-DC mode;
automatically switching, by the UE, from the EN-DC mode to a Single Radio Long Term Evolution (SRLTE)-ENDC mode in response to determining that the VOLTE is not supported by the network entity while the UE is operating in the EN-DC mode; and
configuring, by the UE, a first transceiver of the at least two transceivers for both the voice service based on a third radio and data services based on a first radio and a second transceiver of the at least two transceivers for a data service based on the first radio or a second radio while the UE is operating in the SRLTE-ENDC mode.

2. The method of claim 1, wherein configuring the first transceiver for both the voice and data services and the second transceiver for the data service comprises:

determining, by the UE, whether a voice call is being initiated when the data service is active on both the first transceiver and the second transceiver;
sending, by the UE, a first Tracking Area Update (TAU) message indicating lack of EN-DC capability by setting a dual connectivity new radio (DCNR) bit to indicate "dual connectivity with NR not supported" at the UE upon determining that the voice call is being initiated and the data service is active at the UE;
configuring, by the UE, the voice call on the first transceiver and a data service based on the first radio on the second transceiver in response to determining that both the voice call and the data service are active;
sending, by the UE, a second TAU message indicating availability of EN-DC capability by setting the DCNR bit to indicate "dual connectivity with NR supported" at the UE upon determining that the voice call has ended at the UE; and
configuring, by the UE, the data service based on the first radio on the first transceiver and a data service based on the second radio on the second transceiver in response to determining that the voice call is inactive and the data service is active.

3. The method of claim 1, wherein configuring the first transceiver for both the voice and data services and the second transceiver for the data service comprises:

determining, by the UE, whether a voice call is being initiated when the data service is active on both the first transceiver and the second transceiver;
sending, by the UE, a Non-Access Stratum (NAS) message indicating lack of EN-DC capability at the UE upon determining that the voice call is being initiated and the data service is active at the UE;
configuring, by the UE, the voice call on the first transceiver and a data service based on the first radio on the second transceiver in response to determining that both the voice call and the data service are active;
sending, by the UE, a TAU message indicating availability of EN-DC capability by setting a DCNR bit to indicate "dual connectivity with NR supported" at the UE upon determining that the voice call has ended at the UE; and
configuring, by the UE, the data service based on the first radio on the first transceiver and a data service based on the second radio on the second transceiver in response to determining that the voice call is inactive and the data service is active.

4. The method of claim 1, wherein configuring the first transceiver for both the voice and data services and the second transceiver for the data service comprises:

determining, by the UE, whether a voice call is being initiated when the data service is active on both the first transceiver and the second transceiver;

sending, by the UE, an extended service request to release at least one bearer corresponding to at least one radio upon determining that the voice call is being initiated and the data service is active at the UE;

sending, by the UE, a first TAU message indicating lack of EN-DC capability by setting a DCNR bit to indicate "dual connectivity with NR not supported" at the UE after a connection is released;

configuring, by the UE, the voice call on the first transceiver and a data service based on the first radio on the second transceiver in response to determining that both the voice call and the data service are active;

sending, by the UE, a second TAU message indicating availability of EN-DC capability by setting a DCNR bit to indicate "dual connectivity with NR supported" at the UE upon determining that the voice call has ended at the UE; and configuring, by the UE, the data service based on the first radio on the first transceiver and a data service based on the second radio on the second transceiver in response to determining that the voice call is inactive and the data service is active.

5. The method of claim 1, wherein configuring the first transceiver for both the voice and data services and the second transceiver for the data service comprises:

determining, by the UE, whether a voice call is being initiated when the data service is active on both the first transceiver and the second transceiver;

sending, by the UE, a SCG failure message on at least one radio associated with the second transceiver upon determining that the voice call is being initiated and the data service is active at the UE, wherein the UE does not send a measurement report for an event even if configured by a network entity;

configuring, by the UE, the voice call on the first transceiver and a data service based on the first radio on the second transceiver;

reporting, by the UE, the measurement report once the voice call is ended; and configuring, by the UE, the data service based on the first radio on the first transceiver and a data service based on the second radio on the second transceiver in response to determining that the voice call is inactive and the data service is active.

6. The method of claim 1, further comprising;

configuring, by the UE, the voice call on the first transceiver and a data service based on the first radio on the second transceiver in response to determining that both the voice call and the data service are active while the US is operating in the SRLTE-ENDC mode; and configuring, by the UE, the data service based on the first radio on the first transceiver and a data service based on the second radio on the second transceiver in response to determining that the voice call is inactive and the data service is active while the US is operating in the SRLTE-ENDC mode.

7. The method of claim 1, wherein the first radio is a 4G network, wherein the second radio is a 5G network, and wherein the third radio is legacy network.

8. An Evolved-Universal Terrestrial Radio Access Network New Radio-Dual Connectivity New Radio-Dual Connectivity (EN-DC) capable User Equipment (UE) for providing voice and data services simultaneously comprising:

at least two transceivers;

a memory; and a processor, connected to the memory and the at least two transceivers, configured to:

determine whether a Voice over Long Term Evolution (VOLTE) service is supported by a network entity while the UE is operating in an EN-DC mode, automatically switch from the EN-DC mode to a Single Radio Long Term Evolution (SRLTE)-ENDC mode in response to determining that the VOLTE is not supported by the network entity while the UE is operating in the EN-DC mode, and configure a first transceiver of the at least two transceivers for both the voice service based on a third radio and data services based on a first radio and a second transceiver of the at least two transceivers for a data service based on the first radio or a second radio while the UE is operating in the SRLTE-ENDC mode.

9. The UE of claim 8, wherein to configure the first transceiver for both the voice and data services and the second transceiver for the data service, the processor is further configured to:

determine whether a voice call is being initiated when the data service is active on both the first transceiver and the second transceiver;

send a first Tracking Area Update (TAU) message indicating lack of EN-DC capability by setting a dual connectivity new radio (DCNR) bit to indicate "dual connectivity with NR not supported" at the UE upon determining that the voice call is being initiated and the data service is active at the UE;

configure the voice call on the first transceiver and a data service based on the first radio on the second transceiver in response to determining that both the voice call and the data service are active;

send a second TAU message indicating availability of EN-DC capability by setting the DCNR bit to indicate "dual connectivity with NR supported" at the UE upon determining that the voice call has ended and the data service is active at the UE; and configure the data service based on the first radio on the first transceiver and a data service based on the second radio on the second transceiver in response to determining that the voice call is inactive and the data service is active.

10. The UE of claim 8, wherein to configure the first transceiver for both the voice and data services and the second transceiver for the data service the processor is further configured to:

determine whether a voice call is being initiated when the data service is active on both the first transceiver and the second transceiver;

send a Non-Access Stratum (NAS) message indicating lack of EN-DC capability at the UE upon determining that the voice call is being initiated and the data service is active at the UE;

configure the voice call on the first transceiver and a data service based on the first radio on the second transceiver in response to determining that both the voice call and the data service are active;

send a TAU message indicating availability of EN-DC capability by setting a DCNR bit to indicate "dual connectivity with NR supported" at the UE upon determining that the voice call has ended and the data service is active at the UE; and configure the data service based on the first radio on the first transceiver and a data service based on the second radio on the second transceiver in response to determining that the voice call is inactive and the data service is active.

11. The UE of claim 8, wherein to configure the first transceiver for both the voice and data services and the second transceiver for the data service the processor is further configured to:
determine whether a voice call is being initiated when the data service is active on both the first transceiver and the second transceiver;
send an extended service request to release at least one bearer corresponding to at least one radio upon determining that the voice call is being initiated and the data service is active at the UE;
send a first TAU message indicating lack of EN-DC capability by setting a DCNR bit to indicate "dual connectivity with NR not supported" at the UE upon determining that a connection is released;
configure the voice call on the first transceiver and a data service based on the first radio on the second transceiver in response to determining that both the voice call and the data service are active;
send a second TAU message indicating availability of EN-DC capability by setting the DCNR bit to indicate "dual connectivity with NR supported" at the UE upon determining that the voice call has ended at the UE; and
configure, by the processor, the data service based on the first radio on the first transceiver and a data service based on the second radio on the second transceiver in response to determining that the voice call is inactive and the data service is active.

12. The UE of claim 8, wherein to configure the first transceiver for both the voice and data services and the second transceiver for the data service the processor is further configured to:
determine whether a voice call is being initiated when the data service is active on both the first transceiver and the second transceiver;
send, a SCG failure message on at least one radio associated with the second transceiver upon determining that the voice call is being initiated and the data service is active at the UE, wherein the UE does not send a measurement report for an event even if configured by a network entity;
configure the voice call on the first transceiver and a data service based on the first radio on the second transceiver;
report the measurement report once the voice call is ended; and
configure the data service based on the first radio on the first transceiver and a data service based on second radio on the second transceiver in response to determining that the voice call is inactive and the data service is active.

13. The UE of claim 8, wherein the processor is further configured to:
configure the voice call on the first transceiver and a data service based on the first radio on the second transceiver in response to determining that both the voice call and the data service are active while the US is operating in the SRLTE-ENDC mode; and
configure the data service based on the first radio on the first transceiver and a data service based on the second radio on the second transceiver in response to determining that the voice call is inactive and the data service is active while the US is operating in the SRLTE-ENDC mode.

14. The UE of claim 8, wherein the first radio is a 4G network,
wherein the second radio is a 5G network, and
wherein the third radio is legacy network.

* * * * *